Feb. 23, 1932.　　　D. K. TROTTER　　　1,846,287
CULTIVATOR ATTACHMENT FOR TRACTORS
Filed Jan. 22, 1926
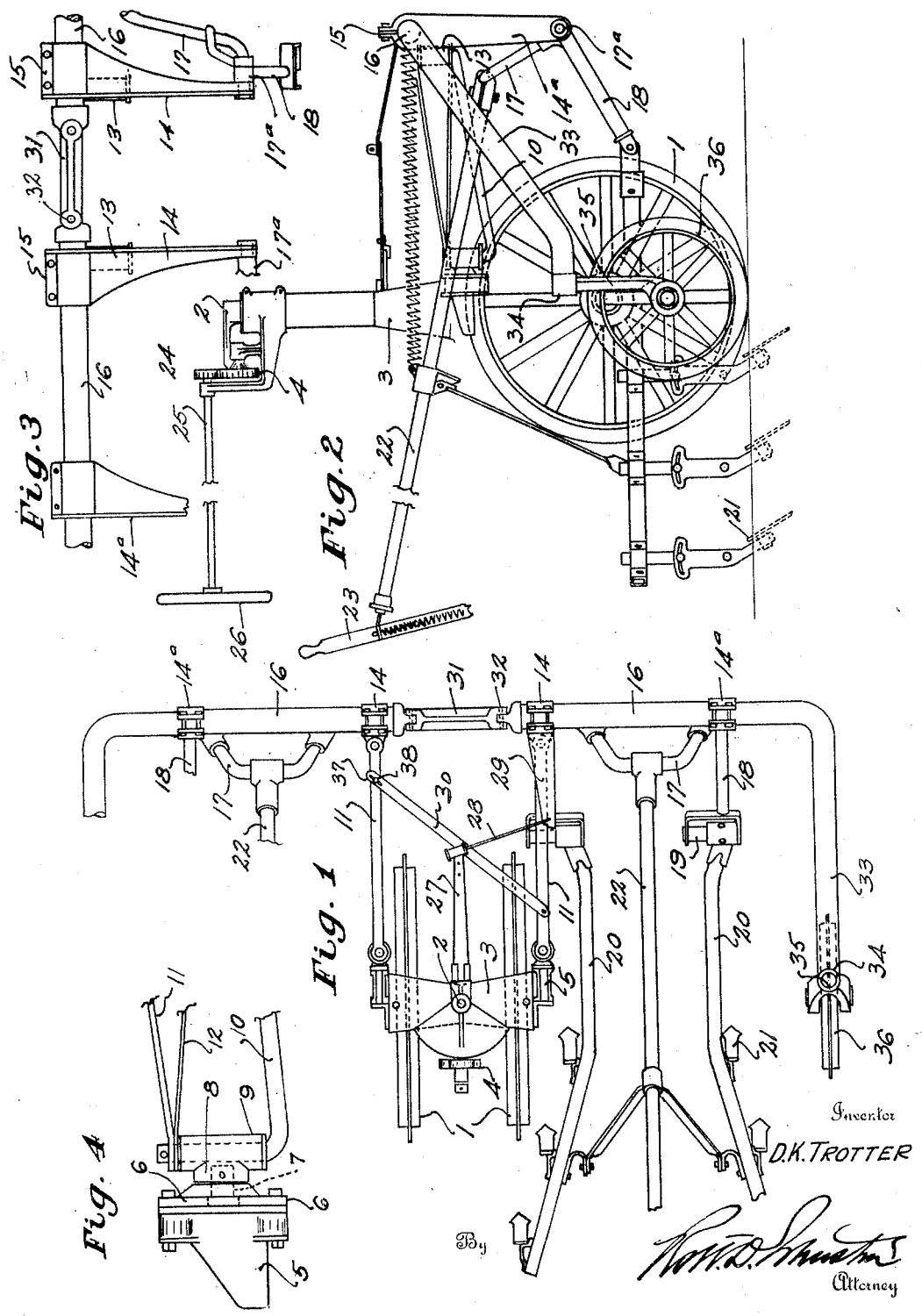

Patented Feb. 23, 1932

1,846,287

UNITED STATES PATENT OFFICE

DAVID K. TROTTER, OF EUTAW, ALABAMA, ASSIGNOR TO INTERNATIONAL HARVESTER COMPANY, A CORPORATION OF NEW JERSEY

CULTIVATOR ATTACHMENT FOR TRACTORS

Application filed January 22, 1926. Serial No. 82,999.

My invention relates to certain new and useful improvements in cultivator attachments for tractors, and particularly for attachments adapted to be mounted in front of the tractor.

Attachments of the type to which my invention more particularly relates are illustrated in the patent to Benjamin, No. 1,539,108, issued May 26th, 1925, wherein is shown a rigid transverse frame member supported in front of the tractor by arms pivotally mounted on the tractor so as to swing in a horizontal plane. The rigid transverse draft member has suitably connected thereto the cultivating implements which act in front and on each side of the forward tractor wheels. This device has come into wide spread use and has many important advantages, but in its practical use I have found that the rigidity of the front draft member and the confining of its swing to the horizontal plane, interfere with the uniform action of all of the cultivating devices when the implement is utilized over sloping or irregular ground surfaces. The more important objects of my invention therefore are to improve and perfect this type of implement where it is desired to have the ends of the draft member connected by interposing a flexible coupling in the center of its front draft member to which the cultivating implements are attached; by extending that member downwardly and rearwardly at each end to carry ground supports such as wheels adapted to travel preferably in substantial transverse alignment with the front tractor wheels; and by mounting the swinging supports for the front draft member upon swivels which will permit the articulated sections of the draft member to follow the contour of the ground independently at each side and thus practically to effect a like cultivation of the ground on both sides of the tractor.

My invention will be better understood by reference to the accompanying drawings, where it is illustrated in its preferred embodiment only.

In the drawings:—

Fig. 1 is a plan view of my improved cultivating attachment with only a front draft member of the tractor shown in full lines to explain the manner of connection of my attachment to a typical tractor.

Fig. 2 is a side elevation of Fig. 1 showing the front tractor wheels; and

Fig. 3 is a detail view of the flexible coupling in the front draft member.

Fig. 4 is a detailed side elevation of an outrigger swivel support.

Similar reference numerals refer to similar parts throughout the drawings.

In the embodiment of my invention illustrated, I show an attachment adapted for two row cultivation and which is intended to be mounted upon the narrow forward main frame or body of a tractor or the like so as to operate in advance of the latter. In the drawings I have illustrated just sufficient of the tractor to make clear the manner of mounting my attachment thereto. The drawings show the front steering truck of the tractor comprising wheels 1, a steering post 2 which is journaled in the front cross member of a casting 3 and driven by a gear 4. On the forward corners of the frame 3 at each side of the steering post I secure brackets 5 to each of which is bolted a counter bored plate 6 carrying a horizontal forwardly projected swivel pin 7 which has mounted thereon, free to swing in a vertical plane transversely of the tractor, an attachment bracket 8 having a vertical bearing 9 in which the horizontally swinging outrigger supports for the cultivating attachments are mounted. These outriggers comprise a lower rod 10 having its end upturned and adapted to rotate in its respective journal bearing 9 and having its upper end projecting above said bearing and connected to the brace members 11 and 12. The other forward end of the rod is upturned and journaled in a vertical bearing 13 connected to its respective depending arm 14. One of these depending arms is provided at each side of the steering truck and at their upper ends they are rigidly connected by clamps 15 to the adjacent end of the front draft member 16 and at their lower ends they are connected to the ends 17ª of upwardly arched crank shafts 17, each having one end journaled in an arm 14 and the other end journaled in a corresponding arm 14ª clamped to its respective frame member 16 nearer its outer end. To the ends 17ª of each crank shaft is secured a pair of rearwardly extending draft brackets 18 having each on its free end a wrist pin 19 which pivotally supports the forward end of a cultivator beam 20. There are thus provided two beams 20 forming a pair on each side of the steering truck and they may extend to the rear thereof and by reason of the swinging outriggers 10 may be shifted laterally with respect to the truck. Suitable cultivating implements 21 are mounted on the beams 20 and to the central parts of each arched shaft 17 I may pivotally connect the forward ends of an operating rod 22 which extends rearwardly on each side of the tractor and is connected to an operating lever 23 suitably mounted and held in adjusted positions on the rear of the tractor. The steering post gear 4 is in mesh with a gear 24 to be operated by the steering rod 25 that is suitably mounted overhead on the tractor and controlled by a steering wheel 26. This steering post carries a forwardly extending arm 27 connected by a swivel link 28 with an arm 29 fast on one of the brackets 14, and the two outriggers 11 are cross connected by a diagonal link 30 which serves to limit the range of movement when the outriggers are swung together horizontally responsive to the steering of the front tractor wheels 1 to correspondingly shift the front shaft member 16, as more particularly described in the Benjamin patent.

In order that this front draft member may be adapted to flex freely at its center in a vertical plane 1, substitute for the rigid member of Benjamin two end members 16 which are connected at their center by a link 31, the pivot pins 32 which connect this link to the draft members 16 being disposed forwardly and horizontally so that said members 16 are free to break in a vertical plane. This flexing of the front member would be prevented by the outrigger supports 11 but for the swivel mounting of the latter, as shown in Fig. 4. To permit the outriggers to have relative swivelling motion the diagonal cross connecting link 30 has a lost-motion connection at one end and is conventionally illustrated by the slot 37 and pin 38. The flexible central connection in the front draft member necessitates end supports therefor and with this in view the front draft member has its outer ends elongated and bent downwardly and rearwardly at 33 and terminating in vertical bearings 34 which receive the castor frames 35 in each of which a supporting wheel 36 for the attachment is mounted in line with the tractor wheel 1. This constitutes a satisfactory ground support for the ends of the draft member and its attachments, but it is to be understood that other convenient ground supports may be employed.

Having mounted the attachment on the tractor frame in the manner described, it will be seen that the front draft member 16 will be free to flex in a vertical plane so as to permit each of its end supporting ground wheels 36 to follow the contour of the ground and thus to hold the cultivating elements on each side of the tractor equally to their work. The cultivating elements can be steered by the operating connection from the steering rigging of the tractor in the manner described in the Benjamin patent, and in like manner the cultivating implements can be raised, lowered or adjusted by the control means which Benjamin describes. As each end of the draft members plays up and down it is of course necessary for its outrigger supports to swivel and this they will do by reason of the swivel mounting of the bearings in which the outriggers are journaled. The draft rigging thus becomes freely flexible to follow the ground contour with the advantages and for reasons hereinbefore set forth.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. An attachment for tractors and the like, comprising a forward transverse draft member articulated near its center to permit it to break in a vertical plane, an outrigger support for the inner end of each side of the draft member, means to mount said support on the tractor free to swing horizontally and to swivel in a vertical transverse plane, cultivating implements attached to the ends of said draft member, and ground supports for the ends of said draft member.

2. An attachment for tractors and the like according to claim 1, in which the ground supports for the draft member are disposed substantially in transverse alignment with the front wheels of the tractor.

3. An attachment for tractors and the like, comprising a forward transverse draft member articulated to break vertically at its center, a rearwardly extending outrigger support for the inner end of each side of the draft member having means to mount it on the tractor frame free to swing laterally and to swivel in a vertical plane, the ends of said draft member being bent downwardly and rearwardly, supporting ground wheels mounted on said ends of said cross member, and cultivating implements connected to said cross member.

4. In a cultivating attachment for tractors, the combination with a forward frame member of the tractor, of brackets attached to each side of said member and comprising forwardly extending swivel pins, a vertically disposed bearing mounted to swivel on each of said pins, an outrigger mounted in each of said bearings free to swing horizontally, a forward transverse draft member having a pivotal central connection adapted to permit its ends to break in a vertical plane, means connecting each end of said member to an outrigger, the ends of said member being bent downwardly and rearwardly and provided with a supporting castor wheel disposed substantially in alignment with the forward tractor wheels, steering mechanism for the draft member, and cultivating implements suitably attached to the ends of said draft member and having suitable control means, substantially as described.

5. A cultivator attachment for tractors, comprising an extended draft member articulated centrally to permit its opposite ends to swing in a vertical plane, an outrigger support to which the middle portion of said member is connected, means on said support for connecting it to the front of a tractor with the support projecting forwardly and the draft member extending transversely, ground engaging supporting means on the outer ends of said draft member, and straddle-row cultivating implements attached to the extended portions of the draft member and positioned on the inner sides of the ground engaging supports.

6. A cultivator attachment for tractors having front steering wheels, comprising an extended draft member articulated centrally to permit its opposite ends to swing in a vertical plane, means on the middle portion of the member for connecting it across the front of a tractor, supporting means for the ends of said draft member, and tillage implements comprising drag beams connected to the respective ends of the draft member in position to drag at each outer side of the steering wheels when the attachment is in position on the tractor.

7. The combination with a tractor, of a centrally flexible sectional draft member positioned across the front of the tractor with opposite sections extending laterally at each side thereof, means for connecting the middle portion of said member to the tractor for independent vertical movement of the lateral sections thereof, a ground engaging support on the end of each section, and a pair of cultivator beams carried by each section between the ground engaging supports and the sides of the tractor.

8. The combination with a tractor, of a cultivator attachment mounted across the front end of the tractor and comprising oppositely extending members flexibly connected at the inner ends and projecting beyond each side of the tractor at right angles to the longitudinal median line thereof, drag beams connected to each member and trailing at each side of the tractor, and supporting means for said members on the outer ends thereof.

9. The combination with a tractor, of a cultivator attachment mounted across the front end of the tractor and comprising parallel forwardly projecting members mounted on the tractor, opposite laterally extending members supported on said members for free movement vertically and projecting beyond each side of the tractor at right angles to the longitudinal median line thereof, drag beams connected to each member and trailing at each side of the tractor, and supporting means for said laterally extending members on the ends thereof.

In testimony whereof I affix my signature.
DAVID K. TROTTER.